United States Patent [19]

Pizzuti

[11] 4,168,895

[45] Sep. 25, 1979

[54] CAMERA HAVING AUTO FOCUS MODULE

[75] Inventor: Donato F. Pizzuti, Saugus, Mass.

[73] Assignee: Polaroid Corporation, Cambridge, Mass.

[21] Appl. No.: 889,864

[22] Filed: Mar. 24, 1978

[51] Int. Cl.² .................. G03B 3/00; G03B 17/12
[52] U.S. Cl. .................................. 354/195; 354/288
[58] Field of Search ............ 354/25, 195, 286, 288; 352/140

[56] References Cited

U.S. PATENT DOCUMENTS

| | | | |
|---|---|---|---|
| 3,979,762 | 9/1976 | Hendry et al. | 354/288 |
| 4,052,728 | 10/1977 | Hendry et al. | 354/288 X |

Primary Examiner—Michael L. Gellner
Attorney, Agent, or Firm—David R. Thornton

[57] ABSTRACT

A sonic ranging and lens focusing module for cameras having a body casing to enclose functional components including a lens board to support an adjustable lens directed forwardly through an opening in the casing, which module provides structural support for all operative components for adjusting the camera lens focus in response to a ranging signal without interference with existing camera components. All mechanical components of the module are supported on an integral anchor plate formed preferably as a molding of synthetic resinous material and having mounting formations by which individual components may be snap fit into place. The anchor plate additionally is formed with forwardly and rearwardly projecting locating and latching formations by which the assembled module may be accurately and positively secured in front of the camera lens board in snap fit fashion.

13 Claims, 9 Drawing Figures

CAMERA HAVING AUTO FOCUS MODULE

BACKGROUND OF THE INVENTION

This invention relates to photographic apparatus and more particularly, it concerns a ranging and lens focusing module by which an automatic ranging system may be incorporated in an existing camera structure with minimal modification to such existing structure.

U.S. Pat. No. 3,979,762 and No. 4,052,728 issued respectively on Sept. 7, 1976 and on Oct. 4, 1977 to Donald H. Hendry et al., both assigned to the assignee of the present invention, disclose cameras constructed as an assembly of functional modules supported by a primary structural member which defines the camera exposure chamber. The several modules may include, for example, a shutter module, a gear train module, a viewfinder module and a spreader module. Each module represents an independent operating component and as such, may be manufactured independently through to and including pre-testing prior to assembly in the final structure. Each of the modules, moreover, is designed to be assembled to the primary support structure and enclosed within a protective housing completely by complementing snap fastener formations provided as integral module components. As a result, the modules may be assembled without complicated assembly operations to provide highly sophisticated, completely automated and reliable instant cameras which are presently available to the general public at modest costs.

As pointed out in the texts of the afore-mentioned issued patents, a primary manufacturing advantage of the functioning module approach to camera assembly is that technological advances, which represent changes and correspondingly, increased manufacturing costs as a result of such changes alone, can be incorporated without need for additional or modified expensive assembly equipment. In other words, manufacturing costs incident to the addition of an operating function to a basic camera structure is confined largely to the cost of the module providing that function.

While the savings in manufacturing costs resulting from modular construction of components in photographic cameras has been demonstrated in practice and is thus now apparent, it is equally apparent that the incorporation of new technology in a module capable of direct assembly with an existing camera is not attained without substantial innovative and developmental effort. In a commonly assigned co-pending application Ser. No. 729,289, filed Oct. 4, 1976 in the name of Edwin K. Shenk, now abandoned and replaced by application Ser. No. 916,114, filed on June 16, 1978, there is disclosed a camera lens focusing mechanism in which a sonic pulse generated by a camera mounted transducer is reflected from a subject to be photographed and received by the transducer to provide a range signal related to camera-subject distance. An electronic logic circuit responds to the range signal to produce a train of pulses, the number of which is representative of the lens mount axial position at which the subject will be focused. Such pulses are gated into a counter and used for operating a drive motor coupled mechanically to the lens mount. An encoder wheel coupled rotatably with the lens mount operates as a component of an auxiliary pulse generator in a feedback system so that rotation of the drive motor under the control of the counter causes the auxiliary pulse generator to produce a pre-determined number of pulses for each axial unit displacement of the lens mount. The logic circuit further responds to the output of the auxiliary pulse generator to determine when the lens mount has been moved to the position determined by the pulse train counter to be proper for focusing the subject to be photographed. Such further logic circuitry response results in a pawl engaging a lens mount rack to stop movement of the lens mount at the proper focusing position even though the drive motor may continue to rotate. A slip clutch in the drive train between the motor and the lens mount facilitates this latter operating characteristic.

The state of the art relating to electronic logic circuitry presents no problem to the incorporation of such a system in an existing structure primarily because such circuitry may be embodied physically in a chip or board capable of being positioned in available space within a protective casing of a camera, for example. The requirements of a mechanical system capable of reliably driving and positioning a camera lens mount, however, are difficult to meet under the most ideal of conditions. It will be appreciated therefore, that the addition of new technology represented by the ranging and lens focusing system disclosed in the cited co-pending application to the camera structure disclosed in the afore-mentioned patents, involves a major manufacturing burden both in the fabrication and assembly of the mechanical components of the ranging system and in the adaptation of the system to existing camera components.

SUMMARY OF THE PRESENT INVENTION

In accordance with the present invention, the functioning mechanical and electro-mechanical components of an automatic ranging and lens focusing system are completely supported in an operative ranging and lens focusing module capable of direct assembly in an existing camera without modification to moving functional components of pre-existing modules as distinguished from minor modifications to immovable supporting and casing formations. Primary structural support for components of the module and module-camera mounting capability are provided by a unique anchor plate formed as an integral molding of synthetic resinous material. Such focusing system components as a lens rotating ring set, lens focusing drive motor, a friction clutched gear train, a solenoid actuated pawl unit, as well as an accoustical transducer are adapted to be snap fit or otherwise mounted in precise relationship with respect to each other on the anchor plate without specialized tools. The anchor plate, moreover, supports the several components of the module in precise relation to existing camera components and in a manner requiring minimal changes in camera casing configuration.

Alignment of the module incorporated components with the optical axis of the camera is achieved by dowel pin formations on the anchor plate. The dowel pins extend from the rear face of the anchor plate sufficiently so that lateral location and/or positioning may be followed by a direct rearward pushing force on the module to secure a system of snap fasteners between the camera and the ranging and lens focusing module.

Among the objects of the present invention are, therefore: the provision of a ranging and lens focusing module by which an automatic range finding and lens focusing system may be incorporated in an existing camera structure; the provision of such a module by which precise relative positioning of, module incorporated components may be achieved without specialized tools; the provision of a unique anchor plate structure for such a module by which module incorporated components may be assembled and also by which the module may be inserted as a unit into an existing camera body with slight and easily accommodated modifications; and the provisions of such a ranging and lens focusing module which may be incorporated in an existing camera without substantial modification to the exterior appearance of such camera.

Other objects and further scope of applicability will become apparent from the detailed description to follow taken in conjunction with the accompanying drawings in which like parts are designated by like reference numerals.

BRIEF DESCRIPTION OF THE DRAWINGS

FIG. 5 is a fragmentary exploded perspective view illustrating a portion of the anchor plate and components assembled thereon;

FIG. 6 is another exploded fragmentary perspective view depicting the assembly of components with the anchor plate.

DETAILED DESCRIPTION OF THE PREFERRED EMBODIMENT

Figure 1:
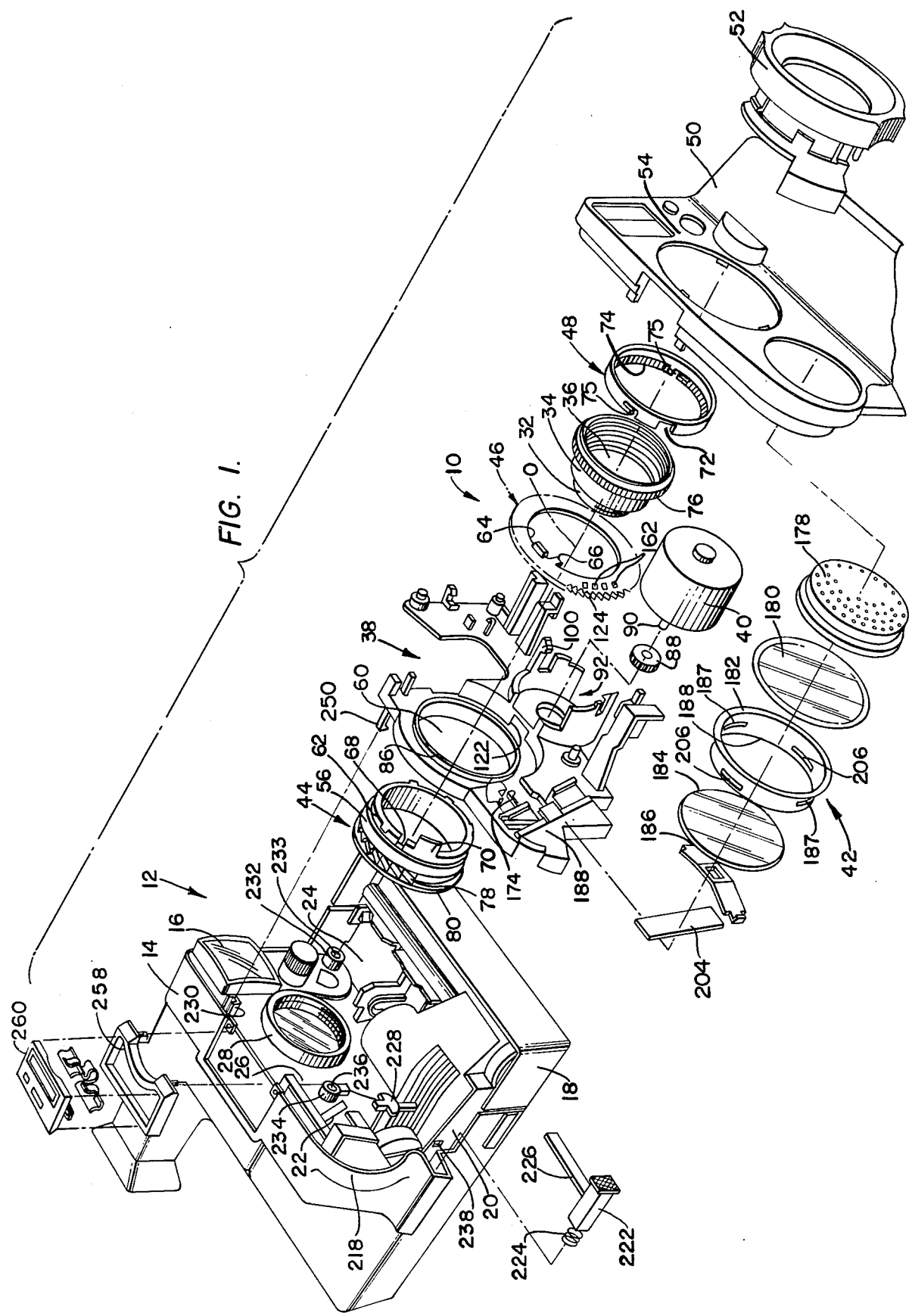
FIG. 1 is an exploded perspective view illustrating components of a ranging and lens focusing module of the present invention in relation to a camera in which the module is to be assembled.
Figure 9:
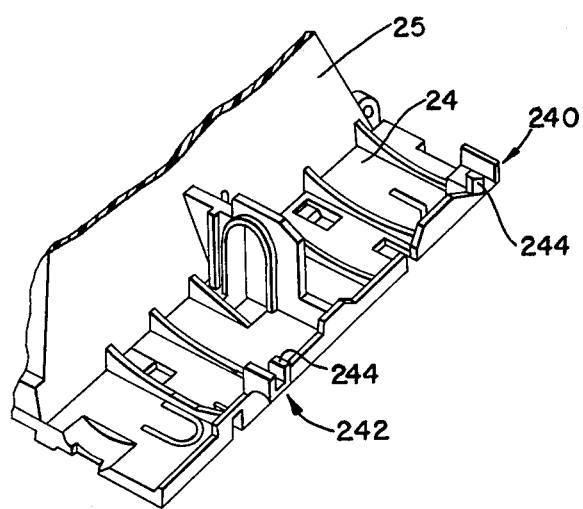
FIG. 9 is a fragmentary perspective view illustrating the apron portion of an existing primary support component of the camera in which the module of this invention is incorporated.

In FIG. 1 of the drawings, several components of a ranging and lens focusing module, generally designated by the reference numeral 10, are shown in exploded perspective relation to a camera body 12 in which the module 10 is to be assembled. The camera body 12 includes an outer body casing 14 which encloses the several modules described in U.S. Pat. No. 3,979,762, above-mentioned. Though not all such existing modules are fully visible in FIG. 1, a reference to this prior patent will enable one to recognize the assembled viewfinder module 16, the spreader module 18, the gear train module 20 and the shutter module 22. Because of its location behind the shutter module 22, the primary support structure on which the identified camera modules are mounted prior to insertion into the body casing 14, is not visible in FIG. 1 except for a lower apron portion 24 which projects forwardly under the shutter module 22. A front fragment support structure is shown in FIG. 9 and designated by the reference numeral 25.

As in prior constructions, the forward face of the shutter module is established by a lens board 26 in which a stationary lens mount 28 is fixedly secured on an objective axis O. The stationary lens mount 28 is further and conventionally provided with internal threads 30 adapted to receive an externally threaded rear portion 32 on a movable lens mount 34, shown in FIG. 1 as exploded from the stationary barrel 28 but on the objective axis O. This interconnection of the two lens mounts provides a commonly employed lens focusing adjustment in which the mount 34 is rotated relative to the mount 28 and thus adjusts the axial position of the lens element 36 supported by the mount 34 relative to the film plane of the camera.

Essentially, the functional modules contained in the body casing 14, as illustrated in FIG. 1, are identical to those used in existing cameras. In other words, the subassembly within the casing 14, as shown in FIG. 1, with the addition of the lens element 36, is generally operable and need only be enclosed within an appropriate cover to constitute a well-known, presently marketed instant camera.

The ranging and lens focusing module 10 is shown generally in FIG. 1 to include as individual components to be described in more detail below, an anchor plate 38, a lens focusing drive motor 40, a transducer 42, a ratchet ring 44, an encoder wheel 46 and a lens retainer ring 48. Additionally shown in FIG. 1 is a casing cover 50 and an automatic/manual (A/M) light shield or collar 52 adapted to be supported rotatably in a journal aperture 54 of the casing cover 50. Support of the A/M collar 52 by the casing cover 50 distinguishes the collar 52 as a component of the module since it is not physically supported by the anchor plate 38. In this context, it is to be noted that the anchor plate 38 provides support for all components of the module 10. It is formed of synthetic resinous material, preferably of a type available from the General Electric Company under the tradename "Lexan," injection molded in one piece and having approximately a 3% silicone content for lubricating qualities. In the ensuing description, the several and varied functional formations on the integral structure of the anchor plate, will be described with reference to the module components cooperating therewith or with reference to camera body components. The respective front, back and top views of FIGS. 2, 3 and 4 of the drawings are reasonably accurate and will enable one skilled in the art to appreciate detailed configurations of the functioning formations on the anchor plate 38.

In the assembled module, the ratchet ring 44 and the encoder wheel 46 are secured together by snap fit to rotate as a unit about the optical axis O as a result of an external journal or bearing surface 56 on the ratchet ring rotatably engaging an internal bearing surface 58 about the edge of a journal opening 60 in the anchor plate 38 and concentric with the axis O. The ratchet ring 44 is formed as an annular member having a bearing portion providing bearing surface 56 and a forwardly projecting portion 62, stepped to a reduced diameter relative to the bearing surface 56, which extends through the opening 60 to the front face of the anchor plate 38 to make the snap fit within a central aperture 64 in the encoder wheel 46. A radial tang 66 on the encoder wheel engages in an axial slot 68 of the forward portion 62 to key the encoder wheel 46 and ratchet ring 44 for rotation one with the other. An axial tang 70 on the ratchet ring 44 extends forwardly beyond the encoder wheel 46 to engage an axial slot 72 in the rear of the lens retainer ring 48. The retainer ring 48 is formed with internal teeth or serrations 74 adapted to engage corresponding external serrations 76 on the movable lens mount 34 and a plurality of finger portions 75 of the ring 48 are forced over and snapped into place behind the serrations 76 to form a movable lens ring assembly (not shown). In light of this organization, it will be seen that when the lens ring assembly is mounted in the stationary lens mount 28 and within the encoder wheel 46 and ratchet ring 44, these components will rotate as a unit due to the axial tang 70 engaging the axial recess 72 in the retainer ring 48 coupled with the nonrotatable connection of the retainer ring with the lens mount 34 as a result of the serrations or teeth 74 and 76. On the other hand, axial movement of the lens ring assembly, relative to the ratchet ring 44 occurs as a result of permitted axial movement between the axial tang 70 and the axial slot 72.

Figure 2:
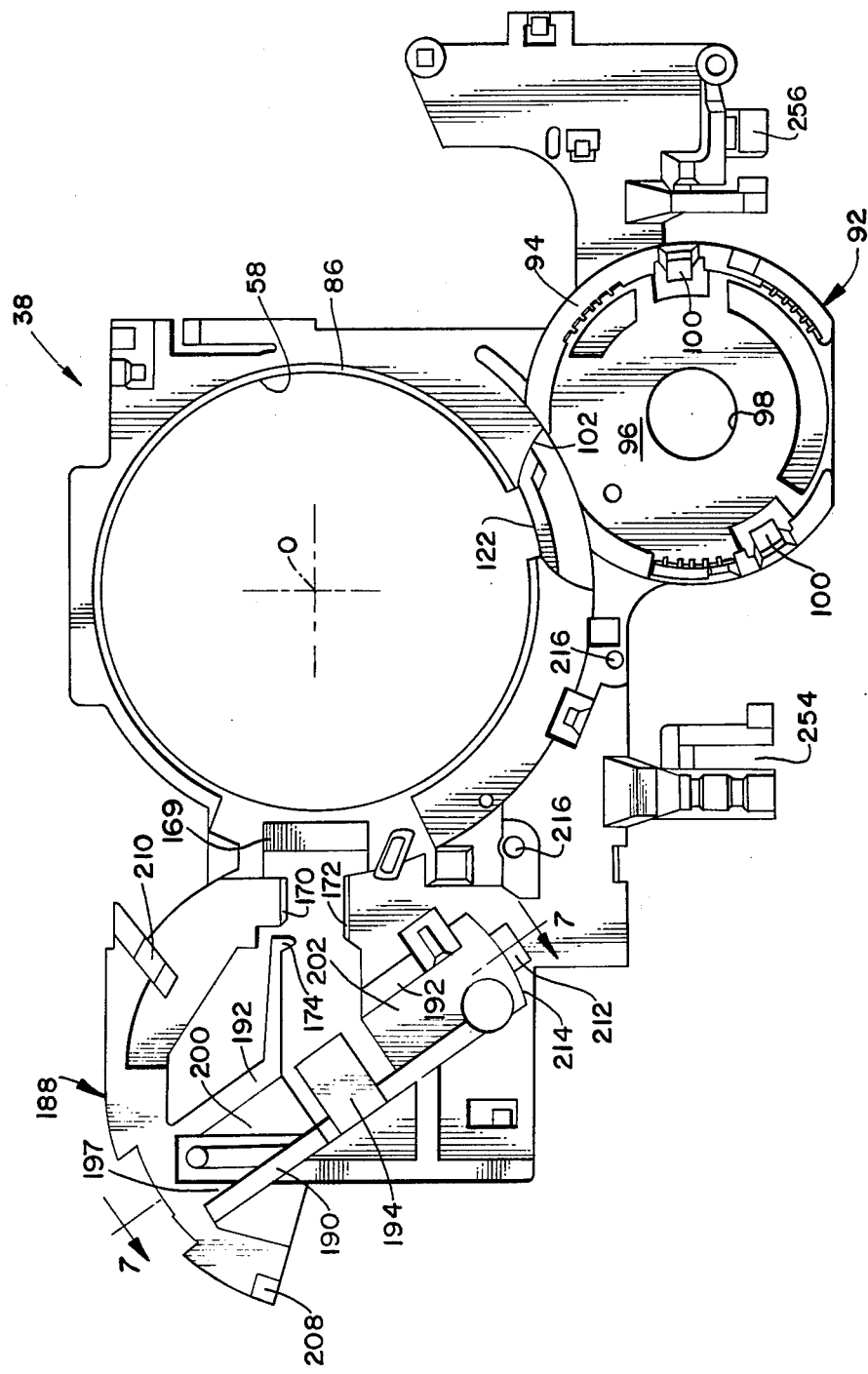
FIG. 2 is an enlarged front elevation of an anchor plate which forms the support chassis of the module of FIG. 2.
Figure 3:
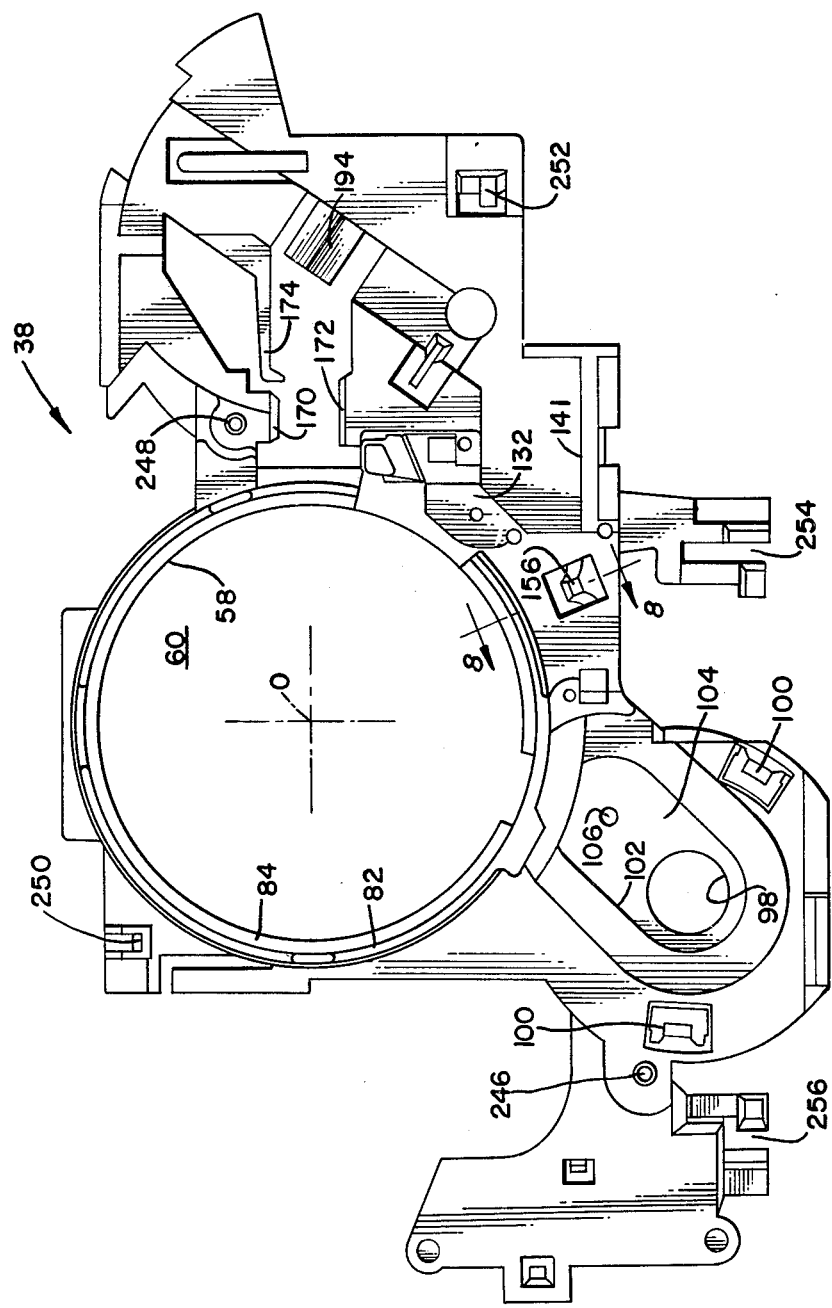
FIG. 3 is a rear elevation of the anchor plate shown in FIG. 2.
Figures 5, 6:
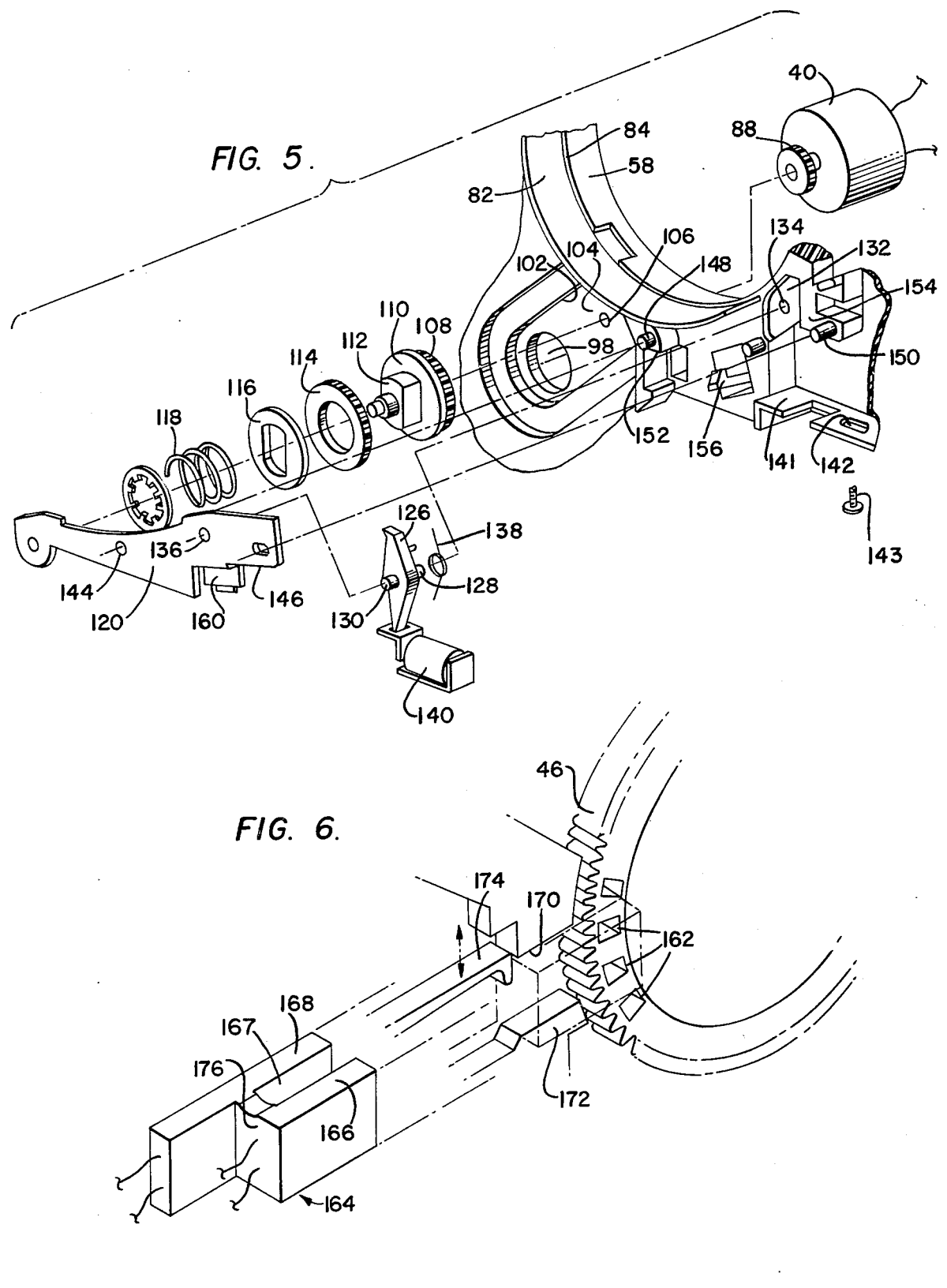

As may be seen most clearly by reference to FIGS. 1, 3 and 5 of the drawings, the external bearing surface 56 on the ratchet ring 44 terminates rearwardly in radially projecting ratchet teeth 78 which, in turn, terminate rearwardly in an annular flange portion 80. As shown in FIGS. 3 and 5, the journal aperture 60 projects forwardly through the rear face of the anchor plate 38 as a circular or axially extending shroud 82 of increased inside diameter relative to the internal bearing surface 58 to provide a radial ledge or step 84. The ledge 84 serves as an abutment against which the ratchet teeth 78 engage to limit forward movement of the ratchet ring in the journal opening 60. On the other hand, the opening 60 extends rearwardly through the front face of the anchor plate 38 to a circular rib having a radial bearing face 86 (see also FIG. 2) against which the rear of the encoder wheel 46 rests. Because of the snap fit axial interconnection of the encoder wheel with the ratchet ring, it will be understood that while both of these components may rotate in the journal aperture 60, they are constrained against axial movement with respect to the anchor plate by means of the step 84 and rib face 86. Yet, because of the permitted axial movement between the ratchet ring 44 and the lens retainer ring 48, axial movement of the lens 36 is accommodated.

As subsequently explained, the ratchet ring encoder wheel assembly (shown exploded in FIG. 2) is rotatably driven to focus the lens 36 by means of a gear toothed circumference 124 of the encoder wheel, and the latter also includes circumferentially spaced apertures for encoding the position of the lens 36; however, it should be noted that the ring encoder assembly could be altered in a number of ways while still functioning as described. For example, the encoder wheel rather than the ratchet ring could be directly coupled to the lens. The ratchet 78 and the gear teeth 124 could be interchanged, etc.

Figure 4:
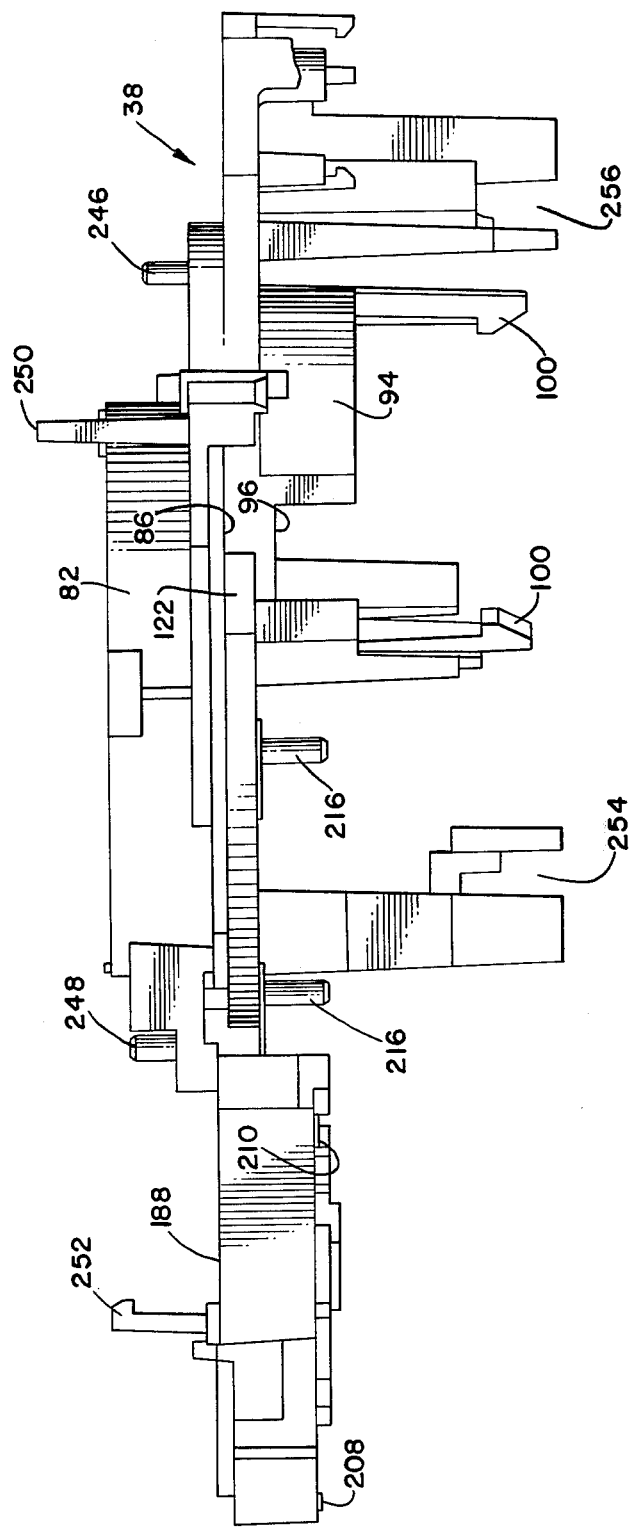
FIG. 4 is a top plan view of the anchor plate.

The lens drive motor 40 (shown in FIG. 2) together with a pinion drive gear 88 securely mounted on the drive motor shaft 90, is adapted to be received in a motor bracket 92 formed on the front face of the anchor plate 38. As shown in FIGS. 1, 2 and 4 of the drawings, the motor bracket 92 is defined in part by a forwardly projecting cylindrical wall formation 94 terminating rearwardly in a radial face 96 having a central aperture 98 through which the pinion gear 88 may extend. A pair of axially projecting latch formations 100 projecting from the circular wall formation 94 snap fit about the forward end of the motor 40 upon insertion of the motor into the motor bracket 92.

As shown in FIGS. 3 and 5, the rear face of the anchor plate 38 behind the motor mounting bracket 92 is formed with an oblong recess 102 having a flat floor 104 which lies in a plane spaced slightly forwardly of the plane of the radial rib face 86 against which the encoder wheel 46 abuts. The floor 104 is formed with a shaft bearing aperture 106 adapted to receive the forwardly extending shaft of a drive gear 108 (see FIG. 5). The back of the gear 108 is formed with a radial friction face 110 from which a torque block 112 projects. A gear ring 114 is journalled on the torque block 112 and urged against the face 110 by a slotted washer 116 under the bias of a compression spring 118. The rear end of the gear 108 is journalled in a clutch-pawl bearing bracket plate 120 adapted to be secured against the rear face of the anchor plate 38 in a manner to be described. It will be appreciated, therefore, that the assembly of gears 108 and 114 constitute a friction clutch in which the gears 108 and 114 will rotate as a unit for so long as the ring gear 114 is seized between the washer 116 and face 110 with sufficient force so that torque transmitted by friction is not exceeded by a torque input/output differential.

As above mentioned, the floor 104 of the recess 102 lies in a plane spaced forwardly of the radial rib face 86. This spacing is adequate for the gear 108 to lie in the same plane as the encoder wheel 46 in the assembled module. Also it will be noted in FIGS. 1 and 2 of the drawings, an opening 122 is provided at the upper end of the slot 102 so that the gear 108 may mesh with teeth 124 on the periphery of the encoder wheel 46. The axial positioning of the pinion gear 88 on the motor shaft is such that the gear 88 meshes with the gear ring 114. A drive train from the motor 40 to the movable lens 36 is thus completed by way of the pinion gear 88, the gear 108, the ring gear 114, the encoder wheel 46, the ratchet ring 44 and the lens retainer ring 48.

Also as shown in FIG. 5 of the drawings, a pawl member 126 having front and rear pivot trunnions 128 and 130 is adapted to be mounted in a recess 132 in the rear face of the anchor plate 38 by journalled engagement of the front trunnion 128 in a bearing aperture 134 in the floor of the recess 102. The rear trunnion shaft 130 extends through an aperture 136 in the clutch-pawl bracket plate 120. The pawl member 126 is biased by a spring 138 to a neutral or inoperative position and pivotted by a solenoid 140 into engagement with the ratchet teeth 78 on the ratchet ring 44. To this end, it will be noted that the axial shroud 82 covering the ratchet teeth 78 is interrupted in the region of the recess 132. The pawl is located in the radial plane of the teeth 78 by the recess 132 and thus will pivot into engagement with the ratchet teeth when the solenoid is energized. It will be noted further that the rear face of the anchor plate 38 is provided with a ledge 141 on which the solenoid may be mounted by a screw 143 extending through a slot 142. Because of this construction, the solenoid gap may be adjusted.

Figure 8:
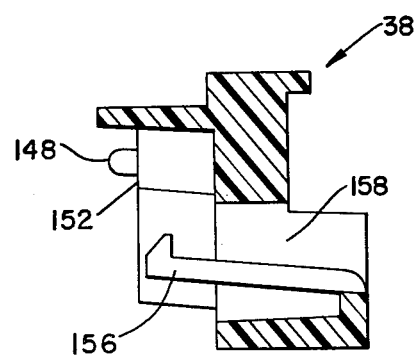
FIG. 8 is an enlarged fragmentary cross-section taken on line 8—8 of FIG. 3.

As may be seen in FIGS. 5 and 8 of the drawings, the clutch-pawl bracket plate 120 is formed with a pair of locating holes 144 and 146 to be aligned with pin formations 148 and 150 projecting from flats 152 and 154 at the rear face of the anchor plate. A resilient hook latch formation 156 projects rearwardly through an opening 158 in the anchor plate 38 in a position to engage a forwardly struck tang 160 on the bracket plate 120. As a result of this construction, it will be appreciated that the entire assembly of the gear train and the pawl may be contained against the rear face of the anchor plate 38 by snap fit assembly of the bracket plate 120 against the flats 152 and 154 as a result of the latch formation 156 engaging the tang 160.

As described in the aforementioned co-pending application Ser. No. 729,289, the logic circuitry of the automatic focusing system disclosed therein provides appropriate controls by which the motor 40 may be energized to rotate the encoder wheel 46, and hence the lens 36, preferably from a reference position beyond infinity to a position wherein a subject to be photographed is in focus on the camera film plane as a result of the range detection facility provided by this system. A determination of when the lens 36 has moved to the appropriate position for focus is effected by an auxiliary pulse generator (not shown) associated with the lens coupled encoder wheel 46. While the details of the logic circuitry have been omitted from the drawings in the interest of more clearly illustrating the mechanical assemblage of the module 10, the disclosure of the co-pending application Ser. No. 729,289 is incorporated herein by reference to the extent that it is needed for one skilled in the art to practice the present invention.

As an incident to the summarized focusing system operation, the encoder wheel 46, as shown in FIG. 6, is provided with a series of openings 162 spaced angularly by opaque wheel portions and located to move in alternating light transmitting and blocking relationship through a photocell detector unit 164. The detector unit has a pair of opposed legs 166 and 168 forming a channel 167 therebetween configured to receive the encoder wheel 46. The legs 166 and 168 support respectively a light emitting diode and a photosensitive element with appropriate electrical leads (none of which are shown) in order to detect the passage of the apertures or openings 162 in the encoder wheel 46. In accordance with the invention, the detector 164 is supported in its position relative to the encoder wheel 46 partly on a land 169 between a pair of mutually facing rail formations 170 and 172, shown clearly in FIG. 2, and retained therein by a resilient latch formation 174. Specifically, the detector unit 164 is merely pushed or slid to its latched position, shown in dotted lines in FIG. 6, between the rail formations 170 and 172 with detector channel 167 receiving the wheel 46 until the end of the latch formation 174 engages a rear face 176 on the detector unit 164. In this manner, the detector unit is both easily mounted on the anchor plate 38 and secured firmly in its position relative to the encoder wheel 46.

Also mounted on the anchor plate 38 is the transducer 42 which is a capacitance-type electro-accoustical transducer of a construction described fully in another commonly assigned co-pending application Ser. No. 806,056 filed on June 13, 1977 in the name of R. Paglia, now issued on Apr. 18, 1978, as U.S. Pat. No. 4,085,297. As disclosed in this latter co-pending application, and as shown in FIG. 1 of the drawings, the transducer 42 includes a circular apertured cover 178, a diaphragm 180 having a conductive front face, an inner support ring 182, a back plate 184 and a transducer assembly spring 186. These components of the transducer together with electrical leads (not shown) connected respectively to the conductive face on the diaphragm 180 and to the back plate 184 are retained in a preassembled condition by the transducer assembly spring 186 extending through slot apertures 187 at diametrically opposite sides of the ring 182.

Figure 7:
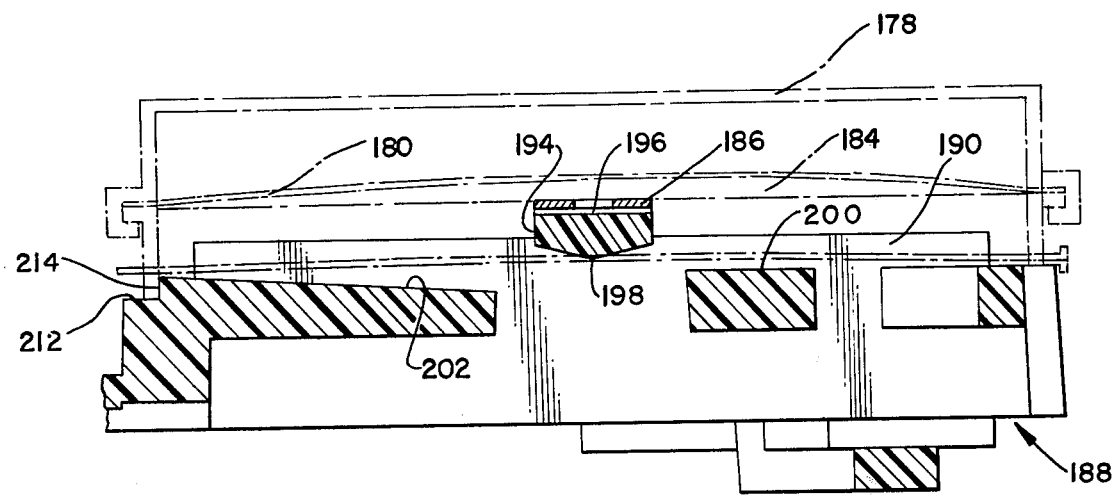
FIG. 7 is an enlarged fragmentary cross-section on line 7—7 of FIG. 2.

In accordance with the present invention, the preassembled transducer 42 is secured to the anchor plate 38 and specifically to a transducer mount portion or bracket 188 as shown most clearly in FIGS. 1, 2 and 7 of the drawings. The mount portion 188 projects laterally of the optical axis O and is thus located in the approximate transversal plane of the lens 36. As shown in FIGS. 2 and 7, the mount portion 188 is provided with a pair of diametrically extending parallel rails 190 and 192 of a length just short of the inside diameter of the ring 182 of the transducer 10. Cantilevered inwardly of the rail 190 is a fulcrum formation 194 having an outer surface (forwardly of the plate 38 as viewed in FIG. 2) of planar configuration and an inwardly or rearwardly directed fulcrum point 198 shown in FIG. 7. The rails 190 and 192 establish a channel 197 having a pair of floor portions 200 and 202 spaced to either side of the fulcrum formation 194. The channel 179 thus defined is of a width complementing the width of a flat leaf-like pin 204 (see FIG. 1) adapted to extend through diametric slots 206 in the transducer mounting ring and oriented at approximately a right angle from the slots 187 through which the transducer assembly spring 186 extends. To facilitate insertion of the mounting pin 204 as explained below, the floor portion 202 is inclined or canted slightly from the plane of the floor portion 200 (see FIG. 7) from a point just below or rearwardly of the adjoining edge of the latter to a point forwardly of this plane at the distal end 214 of the floor portion 202.

As shown most clearly in FIG. 2 of the drawings, but also with reference to FIGS. 4 and 7, it will be seen that the forward face of the mount portion 188 is provided with three bearing pad formations 208, 210 and 212. Both the pads 208 and 210 project forwardly of the front face of the mount portion 188 whereas the pad 112 is recessed slightly rearwardly of the channel floor portion 202 and at the arcuately formed end 214 of the floor 202. The three bearing pads, 208, 210 and 212 lie on a circle having the same radius as the ring 182 of the transducer 42 and define a bearing plane pitch slightly to direct the transducer axis toward the lens axis. In this respect, the rearwardly or recessed orientation of the pad 212 relative to the arcuate end 214 of the floor portion 202 is due to an inclination of this floor portion forwardly as it proceeds to the end 214.

To mount the assembled transducer 42 to the anchor plate 38, specifically in the mount portion 188 thereon, the assembled transducer 42 is placed with the back of the transducer ring 182 engaging the three pads 208, 210 and 212 and with the slots 206 therein aligned with the channel 197 defined by the rail formations 190 and 192. The leaf pin 204 is then inserted through the upper of the slots 206 as viewed in FIG. 2, under the fulcrum formation 194 and through the lower of the slots 206 with ramp-like inclination of the floor 202 facilitating this insertion. Advantageously, the slight flexing of the leaf pin under the fulcrum 194 then retains the transducer under a light bias against the pads 208, 210 and 212 without interfering in any way with its intended sonic pulse transmitting and receiving function.

In light of the foregoing, it will be appreciated that with the exception of the lens-ring assembly, cover casing 50 and the A/M collar 52, each of the module components identified in FIGS. 1, 5 and 6 of the drawings may be preassembled on the anchor plate 38 in the described manner. Electrical switching and electronic logic circuitry have been omitted from the drawings in the interest of more clearly illustrating the mechanical assemblage defining the module 10. A switch block (not shown) may be additionally mounted to the front of the anchor plate 30 and positioned relative thereto by a pair of dowel pins 216 shown in FIG. 2. Also the logic circuitry on a board or chip, connected to electrical components in the module 10 by appropriate leads, may be fixed within the body casing 14 with little difficulty.

The manner in which the assembled module 10 is supported by the camera body will be facilitated by a brief description of components existing within the camera body 12 with reference to FIGS. 1 and 9 of the drawings. As shown in FIG. 1, the body casing 14 is modified to include a cylindrical boss portion 218 to define a rear enclosure for the transducer mount portion 188 of the anchor plate 38. In addition, the casing 14 is modified from prior constructions to provide an activating button channel 220 within which a modified shutter actuating button 222 is slidably received together with a return spring 224. The button 222 is provided with an integral arm portion 226 which extends laterally to engage a shutter actuator 228 from which the prior actuating button was supported in the camera disclosed.

As in the prior camera body constructions described in the aforementioned issued patents, the shutter module 22 near its upper edge supports a forwardly projection channel boss 230 and near its right edge is provided with a stub shaft 232 having a circular aperture 233 therein. The lens board is modified to the left of the lens, in accordance with the present invention, to include an additional, forwardly projecting cylindrical boss 234 having a forwardly opening central aperture 236 therein. In addition, the existing cover of the gear box module 20 is modified to include a recess or aperture 238.

As shown partially in FIG. 1 but more clearly in FIG. 9 of the drawings, the forwardly extending lower apron portion 24 on the primary support structure 25 or "cone" as it is sometimes referred to, is modified to include a pair of spaced receptical or channel-like formations 240 and 242 each defining a tapered post or lug 244.

Particularly, in FIG. 3 of the drawings, the anchor plate 38 is shown to be provided with a system of locating and latching formations projecting from the front and rear faces thereof for positively locating and securing the module 10 by snap fit insertion against the open camera body 12. In particular, this system includes two locating dowel pin projections 246 and 248 on the rear face of the anchor plate in the region of the motor mount 92 and the transducer mount 188 respectively. The pin formations 246 and 248 are further respectively positioned for receipt in the end aperture 233 of the stub shaft 232 and in the aperture 236 of the cylindrical boss 234 on the lens board 26. As a result of the lateral locating function of the pins 246 and 248, the center of the journal opening 60 in the mounting plate is precisely centered on the optical axis of the fixed lens mount 28.

Also projecting rearwardly from the anchor plate 38 are two latch hook formations 250 and 252. The hook formation 250 is located above and to the right of the journal opening 60 as viewed in FIG. 1 and engages the channel boss 230 in the shutter module 22. The hook 252, which is positioned behind the transducer mount portion 188 engages in the gear module cover aperture 238.

Projecting forwardly from the bottom of the anchor plate 38 are foot formations 245 and 256. These foot formations engage and latch to the posts 244 of the socket or channel-like formations 242 and 240, respectively provided on the apron 24 of the camera support structure.

Once the module 10 is assembled with the ratchet ring encoder wheel, the motor and gear drive, the pawl assembly and the transducer as well as electrical logic boards (not shown) and the module is snap fitted to the body casing 14 as described, the lens mount 34 is partly threaded into the lens mount 28 and the lens retainer ring then placed over the movable lens mount 34 in a position to receive the tang 70. Then the casing cover 50 with the A/M ring 52 mounted therein is snapped in place over the module 10 and against the body casing 14. Finally the assembly is completed by a locking cover 258 as shown in FIG. 1. The locking cover 258 is additionally shaped to receive a flash receptacle bonnet 260.

Thus, it will be seen that as a result of the present invention, a highly effective ranging and lens focusing module system is provided by which the above-mentioned objectives are completely fulfilled. It will also be apparent to those skilled in the art that various modifications and/or changes may be made in the embodiment disclosed herein without departure from the inventive concepts manifested thereby. Accordingly, it is expressly intended that the foregoing description is illustrative of a preferred embodiment only, not limiting, and that the true spirit and scope of the present invention be determined by reference to the appended claims.

What is claimed is:

1. An acoustic range finder and lens focusing module for a photographic camera, said camera having a body casing to enclose functional components including a primary structural support for internal camera components and a lens board having means for supporting an adjustable lens directed forwardly of the casing, said supporting means providing axial displacement of said lens responsive to rotation thereof, said module comprising:

an anchor plate having front and rear faces and a journal opening extending through said front and rear faces;
   a ring assembly rotatably supported in said journal opening at a fixed axial position, said ring assembly having means for coupling to said lens to permit common rotation thereof while permitting relative axial movement of said lens;
   a detector unit for sensing angular rotation of said ring assembly;
   means for supporting said detector unit on said anchor plate in operative relationship to said ring assembly;
   an electric motor;
   a drive train;
   means on said anchor plate for supporting said electric motor and said drive train in rotational driving arrangement with said ring assembly so as to rotate said ring assembly and thereby adjust the axial position of said lens in response to energization of said motor in accordance with a control function; and
   a system of locating and latching formations projecting from said rear face of said anchor plate to positively locate said anchor plate with the components supported thereon in fixed relation to the lens board of the camera.

2. The module of claim 1 including a sonic transducer adapted for operation in an electronic ranging system to provide a control function related to subject distance, and said anchor plate additionally including means for mounting said transducer on said front face of said plate.

3. The module recited in claim 2 wherein said sonic transducer includes a support ring having a cylindrical portion extending to a rear edge and having diametrically opposed slots formed therein, and said means for supporting said transducer comprises a mounting portion presented on the front face of said anchor plate, said mounting portion having a rearwardly facing fulcrum formation behind which a leaf spring, extending through said transducer slots, may bear to secure said transducer to said anchor plate.

4. The module recited in claim 3 wherein said transducer mounting portion includes a pair of linear rail formations spaced to define a leaf pin guiding channel, said fulcrum formation being supported from at least one of said rail formations to overlie said channel.

5. The module recited in claim 4 wherein said channel has outer and inner ends on opposite sides of said fulcrum formation and in relation to the direction of leaf pin insertion, said inner end of said channel having a forwardly inclined ramp floor surface to guide leaf pin insertion.

6. The module recited in claim 1 wherein said ring assembly includes a ratchet ring having an annular portion providing an exterior bearing surface dimensioned to rotatably engage said journal opening, said bearing surface having an axial dimension to define front and rear bearing surface edges, a series of ratchet teeth projecting radially from said ring at said rear bearing surface edge, an axial shroud of an internal diameter larger than said internal bearing projecting from said rear face, said shroud defining a radial ledge with said interior bearing surface whereby said ring is prevented from moving axially forwardly in said anchor plate due to engagement of one edge of said ratchet teeth with said ledge.

7. The module recited in claim 6 wherein a front portion of said ratchet ring extends forwardly of said bearing surface front edge, an annular member is fixed to said front ratchet ring portion, said anchor plate includes a circular rib formation on said front face about said journal opening to define an annular radial face to support said annular member against axial rearward movement, said annular member is an encoder wheel having peripheral gear teeth, and said gear train supporting means comprises an elongated recess in said anchor plate rear face, said recess having a base surface adapted for positioning a drive gear of said gear train in the plane of said encoder wheel, said recess opening at one end to enable meshing engagement of said drive gear with said peripheral gear teeth on said encoder wheel.

8. The module recited in claim 1 wherein said ring assembly includes an annular member located at a front edge of said journal opening, said annular member having peripheral gear teeth, and said motor and drive train supporting means including an elongated recess in said rear face of said anchor plate and a motor bracket projecting forwardly of said anchor plate front face, said recess being open at one end to enable meshing engagement of said drive train with said gear teeth of said annular member and a base surface thereat for positioning a drive gear of said train in engagement with said annular member, and said motor bracket terminating rearwardly in a support face having an opening extended through said plate to said gear train recess.

9. The module of claim 1 wherein said ring assembly comprises a pair of annular formations joined in spaced relation by a sleeve portion, said annular formations each having an outer diameter greater than the inner diameter of said journal opening, said sleeve portion having an outer diameter forming a bearing surface dimensioned to rotatably engage said journal opening and an axial length exceeding the thickness of the anchor plate portion forming said journal opening such that each of said annular formations are located on opposite sides of said anchor plate, and at least one of said annular formations having peripheral gear teeth, and said motor and drive train support means is located in adjoining relation to said journal opening with said gear train in driving engagement with said gear teeth of said one annular formation.

10. The module of claim 9 wherein said one annular formation includes a plurality of slots so as to cooperate with said detector unit for sensing rotation of said ring assembly, and said detector support means includes means for supporting said detector on said anchor plate in operative relation to said slots of said one annular formation.

11. The module of claim 9 wherein said other of said annular formations include a plurality of peripheral ratchet teeth, and said module additionally including an actuatable pawl assembly, and said anchor plate having means for mounting said pawl assembly on said plate in operative arrangement with said ratchet teeth of said other ring formation.

12. The module of claim 11 additionally including a sonic transducer for operation in an electronic ranging system to provide a ring assembly stop function by means of said pawl in accordance with subject distance, and said anchor plate additionally including means for mounting said transducer on said front face of said plate.

13. An auto focus camera having a body casing to enclose functional components including: a primary structural support for internal camera components including a lens board extending generally normal to the exposure axis path of the camera, said lens board having means for supporting an adjustable lens, an electronic ranging system including a sonic transducer configured for providing a signal related to subject distance, a detector unit for sensing rotational movement of said lens, a motor and gear train for rotationally driving said lens, the improvement comprising:

an anchor plate having front and rear faces and a journal opening extending through said front and rear faces;

a ring assembly rotatably supported in said journal opening at a fixed axial position, said ring assembly having means for coupling to said lens to permit common rotation thereof while permitting relative axial movement of said lens;

means for mounting said transducer on said front face of said plate;

means for supporting said detector unit on said anchor plate in operative relationship to said ring assembly so as to sense rotation thereof;

means on said anchor plate for supporting said electric motor and said drive train in rotational driving arrangement with said ring assembly so as to rotate said ring assembly and thereby adjust the axial position of said lens in response to energization of said motor in accordance with said control function; and a system of locating and latching formations projecting from said rear face of said anchor plate to positively locate said anchor plate with the components supported thereon in fixed relation to said lens board of the camera.

* * * * *